United States Patent
Lee et al.

(10) Patent No.: US 9,503,679 B2
(45) Date of Patent: *Nov. 22, 2016

(54) DISPLAY APPARATUS

(71) Applicant: SAMSUNG ELECTRONICS CO., LTD., Suwon-si (KR)

(72) Inventors: Jeong Roh Lee, Hwaseong-si (KR); Sung Soo Jung, Suwon-si (KR); (Continued)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,334

(22) Filed: Mar. 2, 2015

(65) Prior Publication Data

US 2015/0189228 A1 Jul. 2, 2015

Related U.S. Application Data

(63) Continuation of application No. 13/730,512, filed on Dec. 28, 2012, now Pat. No. 8,994,773.

(30) Foreign Application Priority Data

Dec. 30, 2011 (KR) .................. 10-2011-0147195
Dec. 30, 2011 (KR) .................. 10-2011-0147260
(Continued)

(51) Int. Cl.
*H04N 7/14* (2006.01)
*H04N 21/4223* (2011.01)
(Continued)

(52) U.S. Cl.
CPC ............ *H04N 7/141* (2013.01); *H04N 5/2257* (2013.01); *H04N 7/142* (2013.01); *H04N 21/4223* (2013.01); *H04N 21/4788* (2013.01)

(58) Field of Classification Search
CPC .......... H04N 7/14; H04N 7/141; H04N 7/142; H04N 21/4788; H04N 21/4223; H04N 5/2257
(Continued)

(56) References Cited

U.S. PATENT DOCUMENTS 5,801,919 A 9/1998 Griencewic
6,847,403 B1 1/2005 Forsberg, Jr. et al.
(Continued)

FOREIGN PATENT DOCUMENTS

CN 101345780 A 1/2009
CN 201749397 U 2/2011
(Continued)

OTHER PUBLICATIONS

Communication dated Apr. 2, 2013, issued by the European Patent Office in counterpart European Application No. 12199459.4.
(Continued)

*Primary Examiner* — Melur Ramakrishnaiah
(74) *Attorney, Agent, or Firm* — Sughrue Mion, PLLC

(57) ABSTRACT

A display apparatus including a main body, a display panel installed in the main body, a video call unit installed to the main body, a circuit board for control of the video call unit, and a cable to connect the video call unit and the circuit board to each other, is provided. Installing the video call unit to the main body enables a video call via the display apparatus.

4 Claims, 9 Drawing Sheets

(72) Inventors: Yong Jin Kim, Seoul (KR); Byung Joo Paek, Suwon-si (KR); Woo Sung In, Hwaseong-si (KR); Woo Young Kan, Seongnam-si (KR); Se Jun Kim, Suwon-si (KR); Doo Soon Park, Yongin-si (KR); Weon Hee Lee, Suwon-si (KR); Jong Hee Han, Yongin-si (KR); Dae Jong Jong Kang, Suwon-si (KR); Jong Pil Seo, Suwon-si (KR); Sung-Il Yang, Hwaseong-si (KR); Hyun Jun Jung, Yongin-si (KR)

(30) Foreign Application Priority Data

| Dec. 30, 2011 | (KR) | 10-2011-0147531 |
|---|---|---|
| Dec. 30, 2011 | (KR) | 10-2011-0147854 |
| Dec. 30, 2011 | (KR) | 10-2011-0147856 |
| Dec. 30, 2011 | (KR) | 10-2011-0147923 |
| Dec. 30, 2011 | (KR) | 10-2011-0147924 |
| Dec. 31, 2011 | (KR) | 10-2011-0147996 |
| Nov. 29, 2012 | (KR) | 10-2012-0137384 |

(51) Int. Cl.
*H04N 21/4788* (2011.01)
*H04N 5/225* (2006.01)

(58) Field of Classification Search
USPC .......................................... 348/14.01–14.16
See application file for complete search history.

(56) References Cited

U.S. PATENT DOCUMENTS

| 8,427,306 | B2 | 4/2013 | Mizoguchi et al. | |
|---|---|---|---|---|
| 8,462,103 | B1* | 6/2013 | Moscovitch et al. | 345/156 |
| 2005/0231587 | A1 | 10/2005 | Root et al. | |
| 2006/0269264 | A1 | 11/2006 | Stafford et al. | |
| 2009/0119709 | A1 | 5/2009 | Kim et al. | |
| 2009/0189973 | A1 | 7/2009 | Root et al. | |
| 2010/0053861 | A1 | 3/2010 | Kim et al. | |
| 2011/0193933 | A1 | 8/2011 | Ryu et al. | |
| 2013/0016267 | A1* | 1/2013 | Ko et al. | 348/333.01 |

FOREIGN PATENT DOCUMENTS

| CN | 202075947 U | 12/2011 |
|---|---|---|
| EP | 2 015 565 A2 | 1/2009 |
| EP | 2015565 A2 | 1/2009 |
| EP | 2056602 A1 | 5/2009 |
| EP | 2 015 565 A3 | 4/2011 |
| JP | 7-115632 A | 5/1995 |
| KR | 10-2004-0017576 A | 2/2004 |
| KR | 10-2004-0024368 A | 3/2004 |
| KR | 10-2009-0041051 A | 4/2009 |
| KR | 10-2010-0012516 A | 2/2010 |

OTHER PUBLICATIONS

International Search Report (PCT/ISA/210) dated Apr. 29, 2013, issued in International Application No. PCT/KR2012/011533.
Communication dated Apr. 5, 2016 issued by the State Intellectual Property Office of P. R. China in counterpart Chinese Patent Application No. 201210585240.3.

* cited by examiner

DISPLAY APPARATUS

CROSS-REFERENCE TO RELATED APPLICATIONS

This is a Continuation Application of U.S. application Ser. No. 13/730,512, filed Dec. 28, 2012, which claims priority from Korean Patent Application No. 10-2011-0147195, filed on Dec. 30, 2011, Korean Patent Application No. 10-2011-0147531, filed on Dec. 30, 2011, Korean Patent Application No. 10-2011-0147854, filed on Dec. 30, 2011, Korean Patent Application No. 10-2011-0147924, filed on Dec. 30, 2011, Korean Patent Application No. 10-2011-0147856, filed on Dec. 30, 2011, Korean Patent Application No. 10-2011-0147923, filed on Dec. 30, 2011, Korean Patent Application No. 10-2011-0147260, filed on Dec. 30, 2011, Korean Patent Application No. 10-2011-0147996, filed on Dec. 31, 2011, and Korean Patent Application No. 10-2012-0137384, filed on Nov. 29, 2012 in the Korean Intellectual Property Office, the disclosures of which are incorporated herein by reference in their entirety.

BACKGROUND

1. Field

Apparatuses consistent with exemplary embodiments relate to a display apparatus including a video call unit to perform multimedia functions, such as a video call, etc.

2. Description of the Related Art

In general, a display apparatus includes a display module on which an image is displayed. Examples of the display apparatus include a television or a monitor.

Recent display apparatuses include a video call unit to provide various multimedia functions, such as a video call, etc., as well as a basic image providing function.

The video call unit may include a microphone module that generates electric signals upon receiving sound waves, and a camera module that captures an image.

SUMMARY

It is an aspect of exemplary embodiments to provide a display apparatus having an installation structure for a video call unit.

Additional aspects of the exemplary embodiments will be set forth in part in the description which follows and, in part, will be obvious from the description, or may be learned by practice of the exemplary embodiments.

In accordance with one aspect of an exemplary embodiment, a display apparatus includes a main body, a display panel installed in the main body, a video call unit installed to the main body, a circuit board for control of the video call unit, and a cable to connect the video call unit and the circuit board to each other.

The video call unit may be installed at an upper end of the main body.

The main body may include a front case defining a front surface and a rear case defining a rear surface, and one from among the front case and the rear case may include a mount on which the video call unit is installed.

The other one from among the front case and the rear case may comprises a holder to support the video call unit installed on the mount, and the video call unit may comprise a protruding portion configured to be supported by the holder.

The video call unit may comprise a camera module for image capturing and a microphone module for sound input.

The video call unit may comprise a housing in which the camera module and the microphone module are accommodated, the housing being installed to the main body, and the housing may be installed to an outer surface of the main body.

The camera module may be rotatably installed to the main body.

The main body may comprise a front case defining a front surface and a rear case defining a rear surface, the front case may comprise a bezel configured to hide an inactive area provided in a rim of the display panel, and the video call unit may be located behind the bezel.

The main body may comprise a front panel formed of a transparent material, the front panel defining a front surface of the main body, and the video call unit may be provided behind the front panel.

The main body may comprise a front panel formed of a transparent material, the front panel defining a front surface of the main body, and the front panel may comprise at least one through-hole formed at a position corresponding to a microphone module.

The main body may comprise a front panel formed of a transparent material, the front panel defining a front surface of the main body, and the video call unit may be provided at the front surface of the front panel.

The video call unit may be provided behind the display panel, and the display panel may comprise at least one through-hole formed at a position corresponding to the video call unit.

The display panel may comprise an active area on which an image is displayed and an inactive area on which an image is not displayed, and the video call unit may be provided behind the inactive area.

The main body may include a bezel configured to hide the inactive area, and the video call unit may be provided behind the bezel.

The video call unit may comprise a camera module for image capturing and a microphone module for sound input, and the bezel may comprise one or more through-holes formed at one or more positions corresponding to the camera module and the microphone module.

The display apparatus may further include a film placed at a front surface of the display panel, the film may include a matrix configured to hide the inactive area, and the video call unit may be placed behind the matrix.

The video call unit may comprise a camera module for image capturing and a microphone module for sound input, and the matrix may comprise a transparent portion formed at a position corresponding to the camera module for transmission of light, and at least one through-hole formed at a position corresponding to the microphone module for transmission of sound.

In accordance with another aspect of an exemplary embodiment, a display apparatus comprises a main body, a display panel installed in the main body, and a video call unit installed at an outside of the display panel.

In accordance with a further aspect of the present invention, a display apparatus comprises a main body, a display panel installed in the main body, and a video call unit installed behind the display panel.

The mount may comprise a rearward facing operating hole which exposes an adjusting wheel. Also, the mount may have a shape corresponding to the video call unit.

The video call unit may employ a Multimedia over Internet Protocol (MoIP).

When the camera module is rotated such that a lens of the camera module does not face forward of the display apparatus, the microphone module may be switched off to disable a video call.

The front case may comprise a second fixing portion extending downward from an upper rear end of the front case, the second fixing portion corresponding to a first fixing portion extending downward from the video call unit.

The inactive area may be provided with at least one from among a circuit and wiring to assist the active area in displaying the image.

BRIEF DESCRIPTION OF THE DRAWINGS

These and/or other aspects of exemplary embodiments will become apparent and more readily appreciated from the following description, taken in conjunction with the accompanying drawings of which.

DETAILED DESCRIPTION

Figure 1:
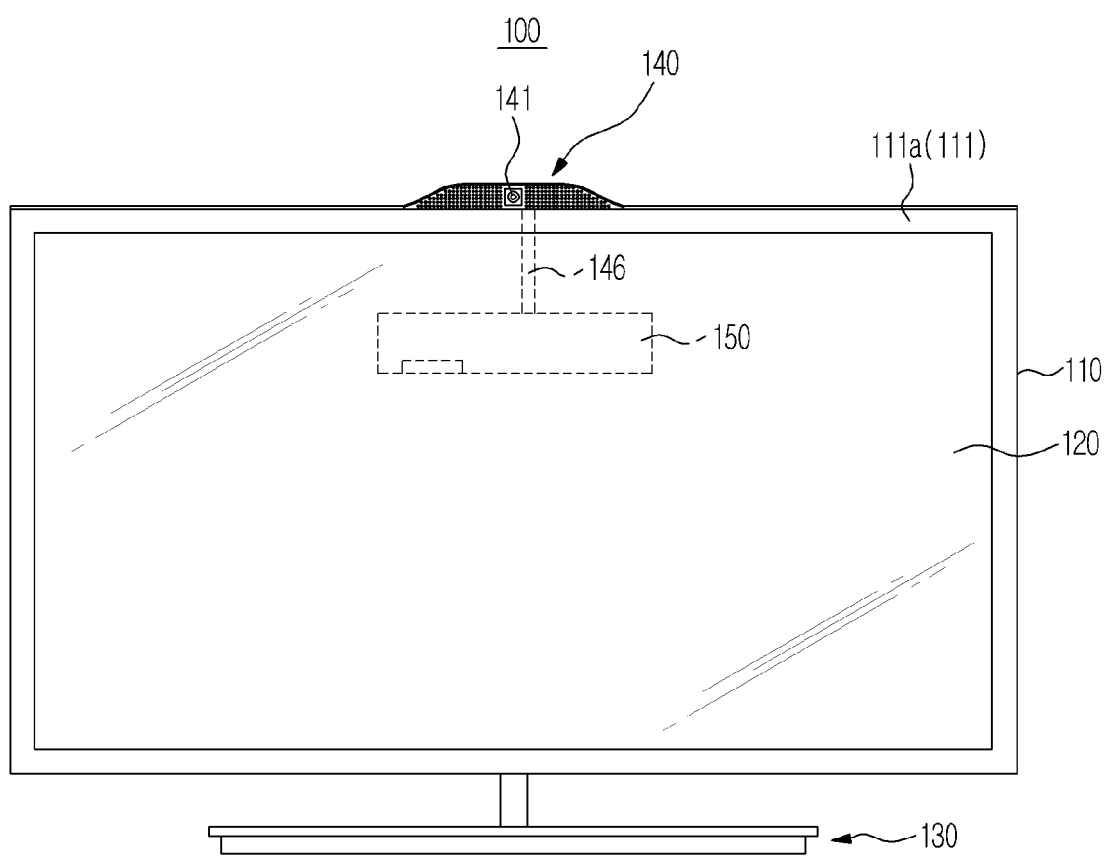
FIG. 1 is a schematic view illustrating a display apparatus according to an exemplary embodiment.

Reference will now be made in detail to a display apparatus according to the exemplary embodiments, examples of which are illustrated in the accompanying drawings, wherein like reference numerals refer to like elements throughout.

As illustrated in FIG. 1, the display apparatus 100 includes a main body 110 defining an external appearance of the display apparatus 100, a display panel 120 installed in the main body 110 to display an image, and a stand 130 placed below the main body 110 to support the main body 110.

The display panel 120 may be a liquid crystal display panel or an organic light emitting diode panel. In the present exemplary embodiment, the display panel 120 is a liquid crystal display panel.

Figure 2:
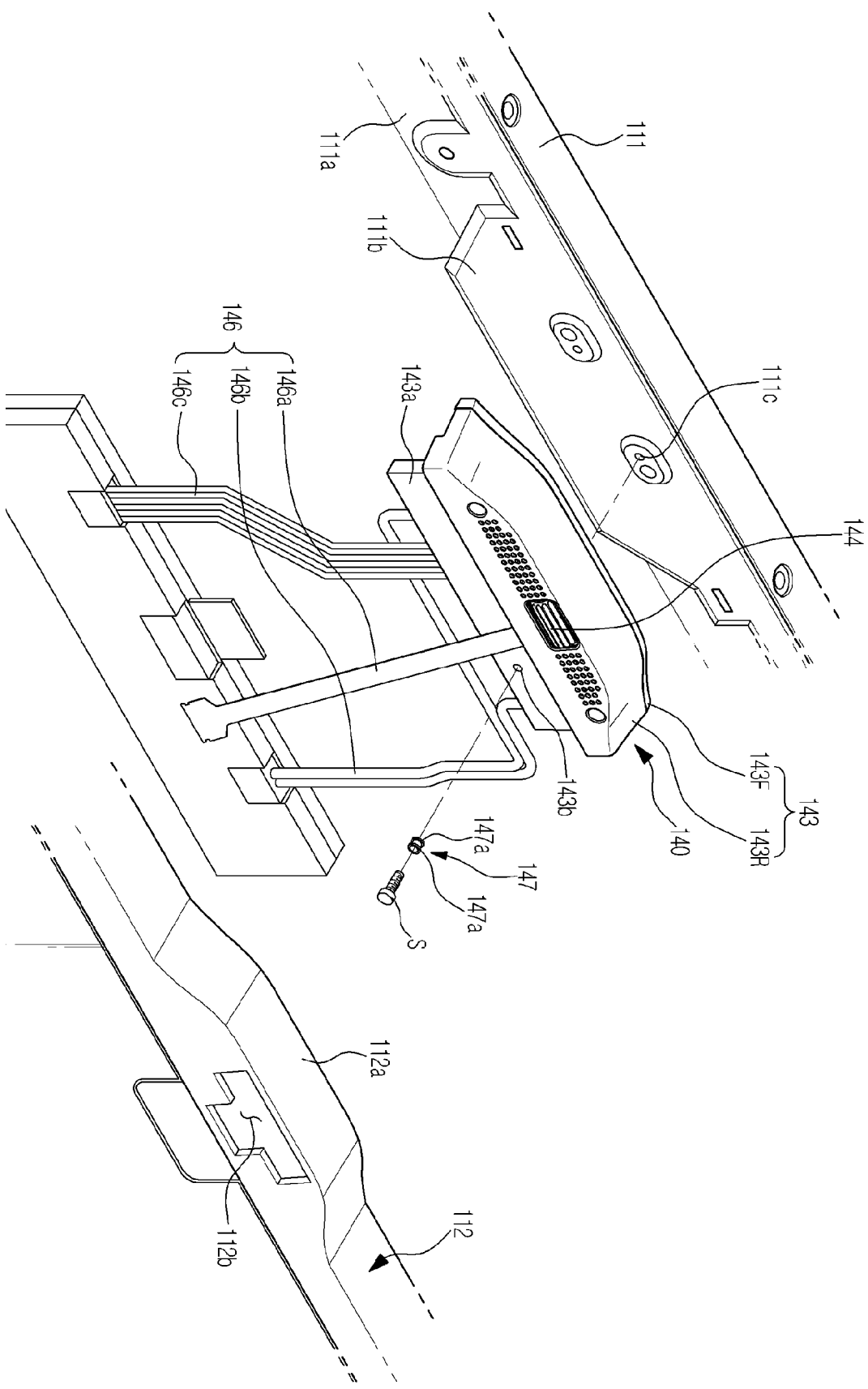
FIG. 2 is an exploded perspective view illustrating installation of a video call unit to a display apparatus according to an exemplary embodiment.

The main body 110, as illustrated in FIG. 2, consists of a front case 111 including a bezel 111a configured to support an outer rim of the display panel 120, the front case 111 defining a front end of the main body 110, and a rear case 112 configured to cover the back of the display panel 120, the rear case 112 defining a rear surface of the main body 110. The display panel 120 is interposed between the front case 111 and the rear case 112. Here, the display panel 120 includes an active area on which an image is displayed, and an inactive area hidden by the bezel 111a, the inactive area having a pattern to allow an image to be displayed on the active area.

A video call unit 140 is installed to the main body 110 to enable a video call via an image provided by the display panel 120. In the present exemplary embodiment, the video call unit 140 is mounted at the center of an upper end of the main body 110 to protrude upward from the main body 110. The video call unit 140 is located outside the display panel 120.

As illustrated in FIG. 2, for installation of the video call unit 140, the rear case 112 is provided at the center of an upper end thereof with a mount 112a. The mount 112a has a shape corresponding to the video call unit 140 such that the video call unit 140 is mounted on the mount 112a. In the present exemplary embodiment, the mount 112a protrudes upward from the center of the upper end of the rear case 112. The mount 112a has an open front side to forwardly expose a front surface of the video call unit 140. An operating hole 112b is perforated in a rear surface of the mount 112a to rearwardly expose an adjusting wheel 144 that will be described hereinafter.

Figure 3:
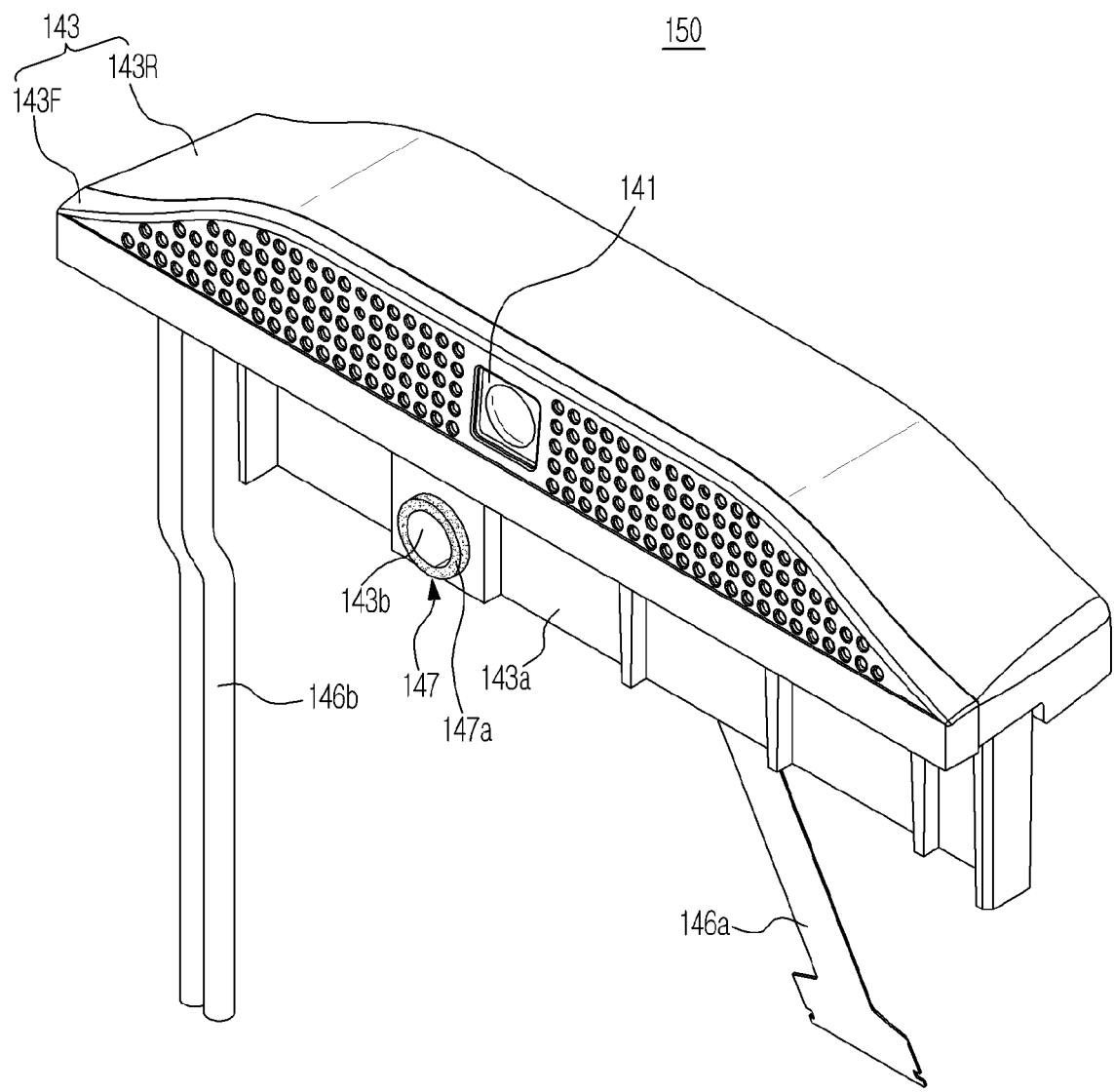
FIG. 3 is a perspective view illustrating the video call unit for the display apparatus according to an exemplary embodiment.
Figure 4:
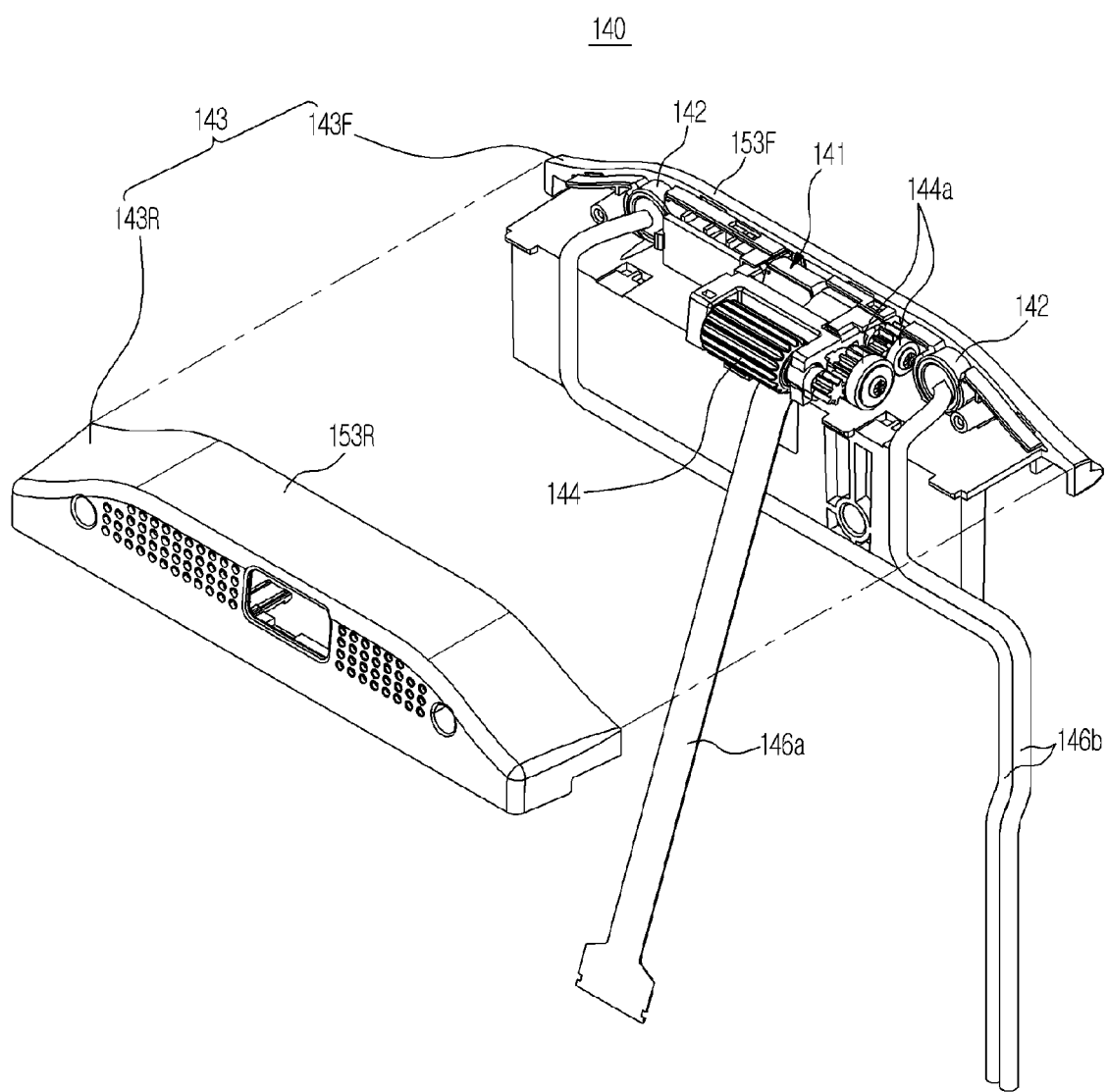
FIG. 4 is an exploded perspective view of the video call unit for the display apparatus according to an exemplary embodiment.
Figure 5:
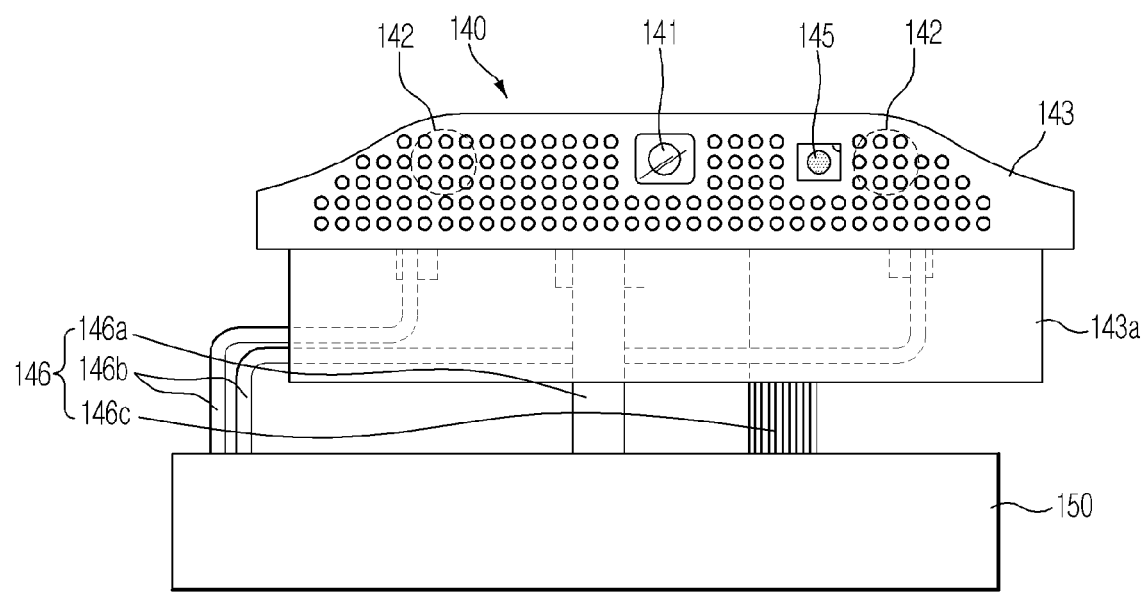
FIG. 5 is a front view of the video call unit for the display apparatus according to an exemplary embodiment.

The video call unit 140 employs a Multimedia over Internet Protocol (MoIP). As illustrated in FIGS. 3 and 4, the video call unit 140 includes a camera module 141 to capture an image of a user, and a pair of microphone modules 142 arranged at both sides of the camera module 141, into which electric signals converted from user voice are input. The video call unit 140 includes a housing 143 defining an external appearance of the video call unit 140. The camera module 141 and the microphone modules 142 are accommodated in the housing 143. The housing 143 is divided into a front housing 143F and a rear housing 143R, which are coupled to each other. The video call unit 140, as illustrated in FIG. 5, may include a communication unit 145 for communication with, for example, a remote controller (not shown) or a shutter glass (not shown) that is used for watching 3D TV.

As a user figure is captured by the camera module 141 of the video call unit 140 and user voice is input through the microphone modules 142, the user may perform a video call using the display apparatus 100.

The video call unit 140 includes the adjusting wheel 144 rotatably installed to the back of the camera module 141 to adjust a tilt angle of the camera module 141, and a plurality of gears 144a to transmit rotation of the adjusting wheel 144 to the camera module 141. If the user applies force to the adjusting wheel 144 to rotate the adjusting wheel 144, rotation of the adjusting wheel 144 is transmitted to the camera module 141 through the gears 144a, causing the camera module 141 to be rotated.

In the present exemplary embodiment, as described above, the microphone modules 142 may be switched on or off based on a rotation angle of the camera module 141. When the camera module 141 is rotated such that a lens of the camera module 141 faces forward of the display apparatus 100, the microphone modules 142 are switched on to enable a video call through the display apparatus 100. When the camera module 141 is rotated such that a lens of the camera module 141 does not face forward of the display apparatus 100, the microphone modules 142 are switched off to disable a video call through the display apparatus 100.

As illustrated in FIG. 2, cables 146 are connected at one end thereof to the video call unit 140 to transmit various signals generated from the video call unit 140. The other end of the cables 146 is connected to a circuit board 150 for control of the video call unit 140.

In the present exemplary embodiment, the cables 146 include a camera cable 146a in the form of a flexible printed circuit board to transmit information on an image captured by the camera module 141 to the circuit board 150, microphone cables 146b in the form of electric wires to transmit information on sound input from the microphone modules 142 to the circuit board 150, and signal lines 146c connecting the communication unit 145 and the circuit board 150 to each other for transmission of various signals.

The circuit board 150 is mounted in the main body 110 behind the display panel 120. That is, the circuit board 150 is interposed between the display panel 120 and the rear case 112.

The aforementioned video call unit 140, as illustrated in FIG. 2, is fixed to the center of the upper end of the front case 111. To this end, the video call unit 140 has a first fixing portion 143a extending downward from the front housing 143F, whereas the front case 111 has a second fixing portion 111b extending downward from an upper rear end thereof so as to correspond to the first fixing portion 143a. As such, the first fixing portion 143a is fastened to the second fixing portion 111b via a screw S, and the video call unit 140 is fixed to the front case 111.

The first fixing portion 143a has a fastening hole 143b through which the screw S passes and is fastened, and the second fixing portion 111b has a fastening hole 111c through which the screw S is fastened. In this case, a buffer member 147 formed of an elastically deformable material is inserted in the fastening hole 143b.

The buffer member 147 takes the form of a hollow cylinder such that the screw S passes and is fastened through the buffer member 147. The buffer member 147 has bumps 147a radially protruding from both ends thereof. After the buffer member 147 is fastened through the fastening hole 143b such that the two bumps 147a protrude from both sides of the fastening hole 143b, the screw S is inserted into the fastening hole 143b to fix the video call unit 140 to the front case 111. Thereby, the video call unit 140 and the front case 111 are indirectly fixed to each other via the buffer member 147.

In such a state, even if the main body 110 vibrates, the buffer member 147 absorbs the majority of the vibration, preventing transmission of vibration or causing transmission of substantially less vibration to the video call unit 140. This ensures stable operation of the video call unit 140, more particularly, of the camera module 141 of the video call unit 140 that is sensitive to vibration.

Figure 6:
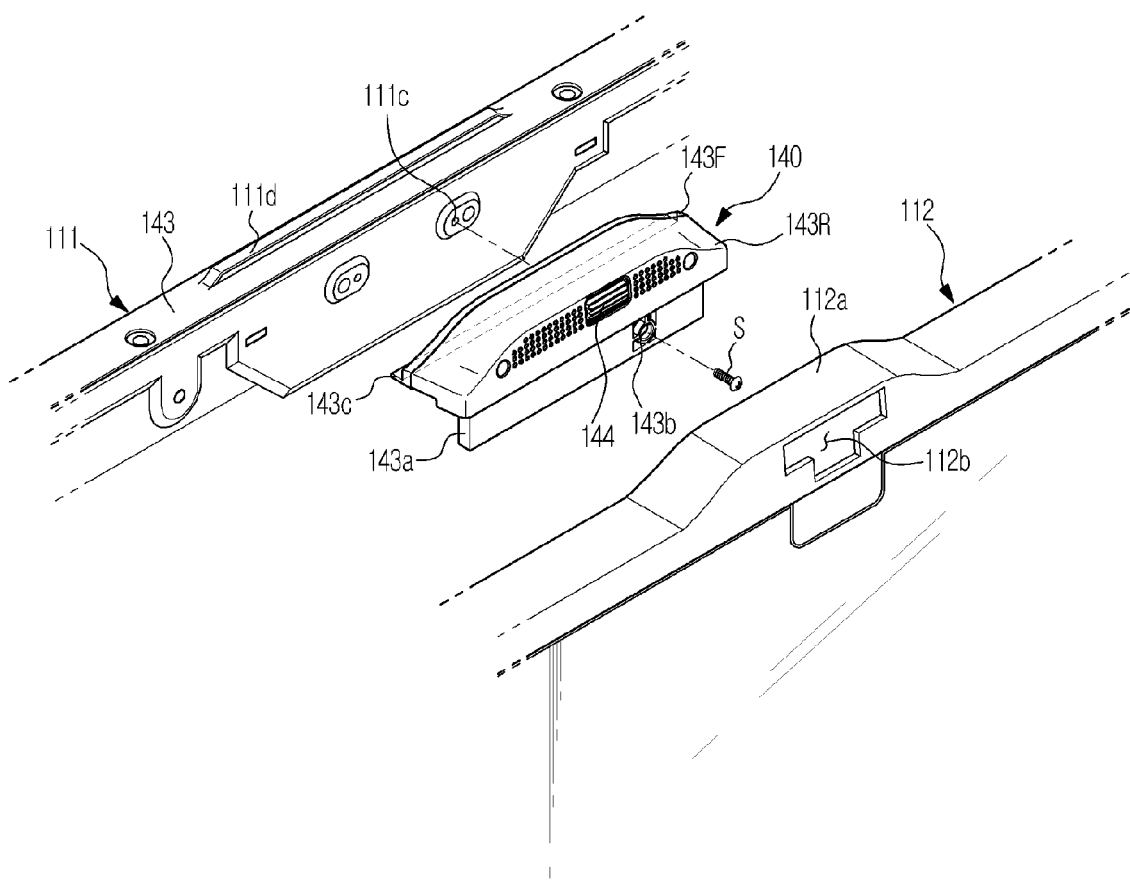
FIG. 6 is an exploded perspective view illustrating installation of the video call unit to the display apparatus according to another exemplary embodiment.

Although the aforementioned exemplary embodiment describes the video call unit 140 as being installed to the front case 111 of the main body 110 via the buffer member 147, the disclosure is not limited thereto. As illustrated in FIG. 6, to allow the video call unit 140 to be more stably installed to the main body 110, the video call unit 140 may have a forwardly protruding portion 143c and the front case 111 has a holder 111d formed at the center of the upper end thereof such that the protruding portion 143c is inserted into and caught by the holder 111d. As the protruding portion 143c is inserted into and supported by the holder 111d, the front side of the video call unit 140 may be more stably installed to the front case 111.

Figure 7:
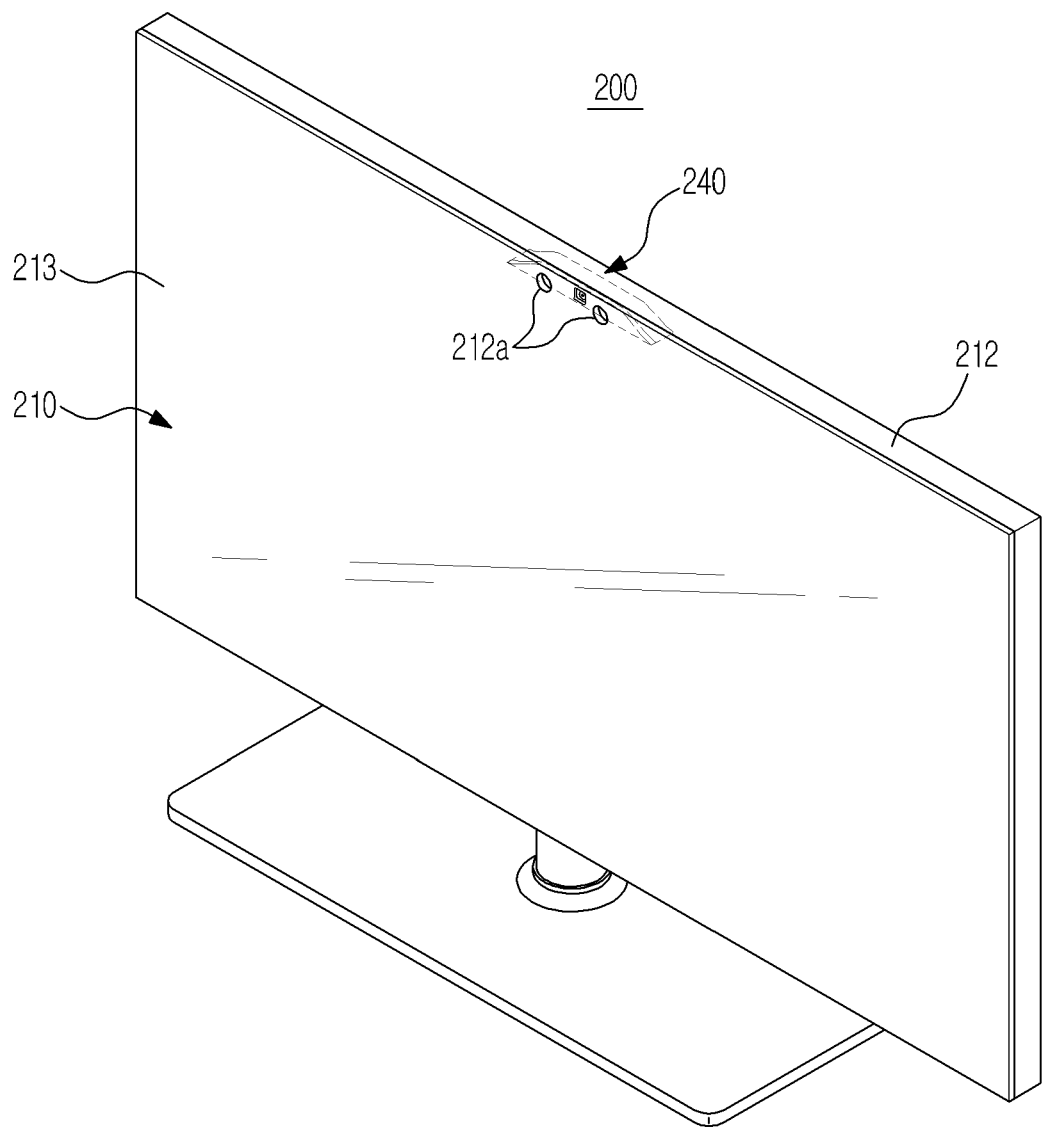
FIG. 7 is a perspective view illustrating installation of a video call unit to a display apparatus according to another exemplary embodiment.

Although the present exemplary embodiment describes the video call unit 140 as protruding upward from the main body 110 to thereby be exposed outward, the disclosure is not limited thereto. As illustrated in FIG. 7, a display apparatus 200 according to another embodiment may include a main body 210 having a front panel 213 that is formed of a transparent material to define a front surface of the main body 210, and a video call unit 240 placed behind the front panel 213 of the video call unit 240 such that the video call unit 240 is hidden by the front panel 213.

Although the display apparatus 200 of the present exemplary embodiment is configured such that the main body 210 does not have a front case and the front panel 213 is directly installed to a rear case 212, the disclosure is not limited thereto. An alternative configuration in which a main body consists of a front case and a rear case and a front panel is installed to a front surface of the front case may be possible.

With the aforementioned configuration, light may be transmitted to the camera module (not shown) through the front panel 213, but sound may be blocked by the front panel 213, thus having difficulty in reaching the microphone modules (not shown). Accordingly, the front panel 213 may have a through-hole 212a at a position corresponding to the microphone module mounted in the video call unit 140, to realize transmission of sound to the microphone module through the through-hole 212a.

Although the video call unit 240 is described as being placed behind the front panel 213 and hidden by the front panel 213, the disclosure is not limited thereto. Alternatively, the video call unit may be placed around the front surface of the front panel. This enables simple installation of the video call unit without change in the interior of a conventional display apparatus.

Figure 8:
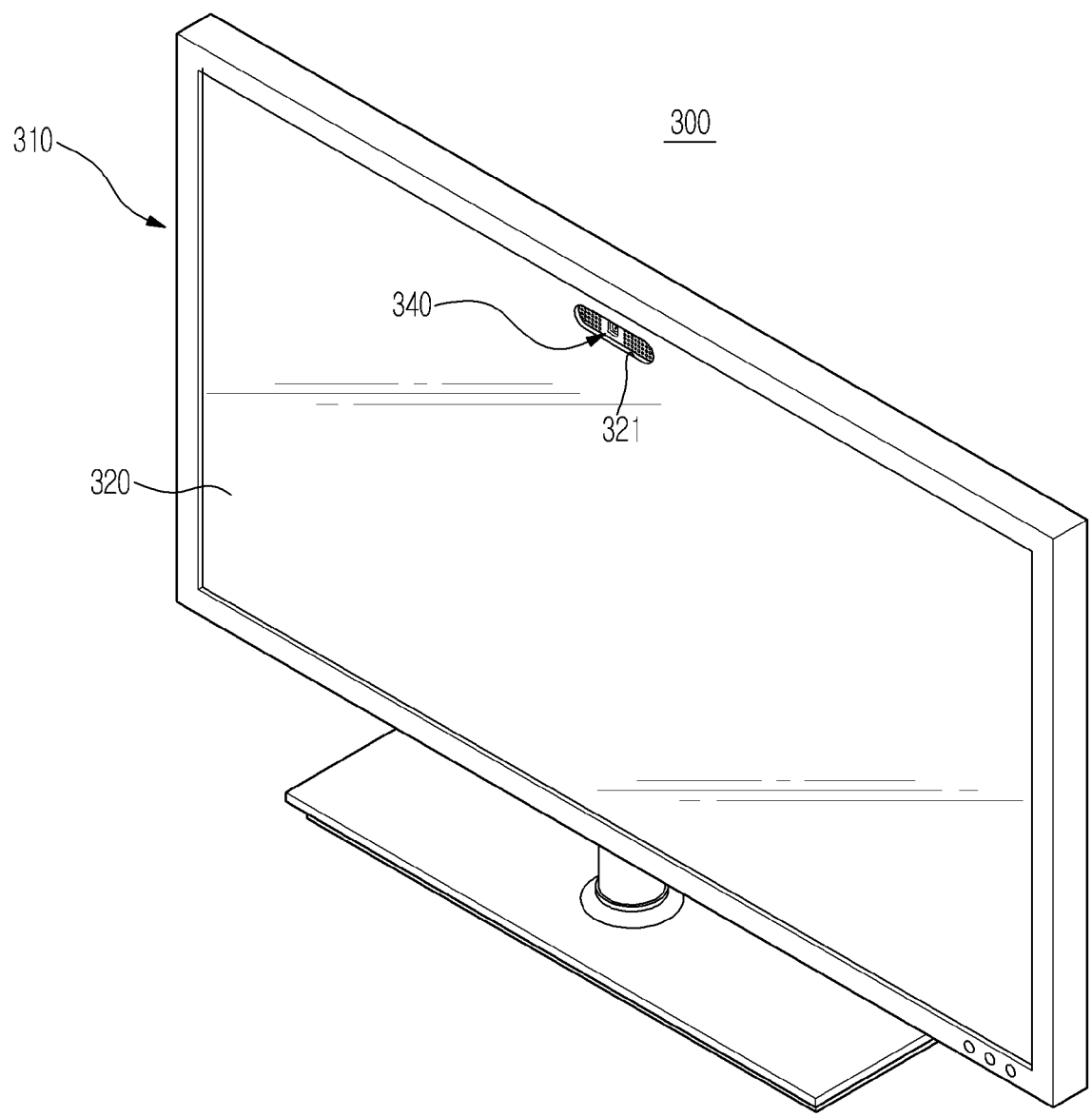
FIG. 8 is a perspective view illustrating installation of a video call unit to a display apparatus according to another exemplary embodiment.

As illustrated in FIG. 8, a video call unit 340 may be placed behind a display panel 320. In this case, the display panel 320 has a through-hole 321 corresponding to the video call unit 340, through which light and sound are transmitted to the video call unit 340.

Additionally, although the aforementioned exemplary embodiment describes the camera module 141 as being manually rotated as the user applies force to the camera module 141 via the adjusting wheel 144, the disclosure is not limited thereto, and the camera module may be rotated by a drive device (not shown) such as a motor, etc. When using the drive device such as a motor, etc., the display apparatus may be provided with a sensor (not shown) such that the camera module may be automatically rotated by the drive device based on a user position sensed by the sensor, or in response to operation of a remote controller or buttons provided at the display apparatus.

Although the aforementioned exemplary embodiment describes the microphone modules 142 as receiving sound from forward thereof, the disclosure is not limited thereto. In one alternative configuration, bi-directional microphone modules may be provided to receive sound from forward and rearward thereof. In another alternative configuration, a microphone module may be installed in a tube (not shown) that takes the form of a hollow pipe having open front and rear sides, such that sound is input to front and rear sides of the display apparatus.

In the aforementioned configuration, since sound from both sides of the tube, i.e. the front and rear sides of the display apparatus is guided by the tube and is transmitted to the front and rear sides of the microphone module, sound transmitted from the front side and the rear side of the display apparatus may be input without a phase difference, regardless of a thickness of the display apparatus to which the video call unit is applied.

Although the aforementioned exemplary embodiment describes the mount 112a for installation of the video call unit 140 as being provided at the rear case 112 and the holder 111d as being provided at the front case 111, the disclosure is not limited thereto. Conversely, the mount may be provided at the front case and the holder may be provided at the rear case.

Hereinafter, a display apparatus using an organic light emitting diode panel will be described.

Figure 9:
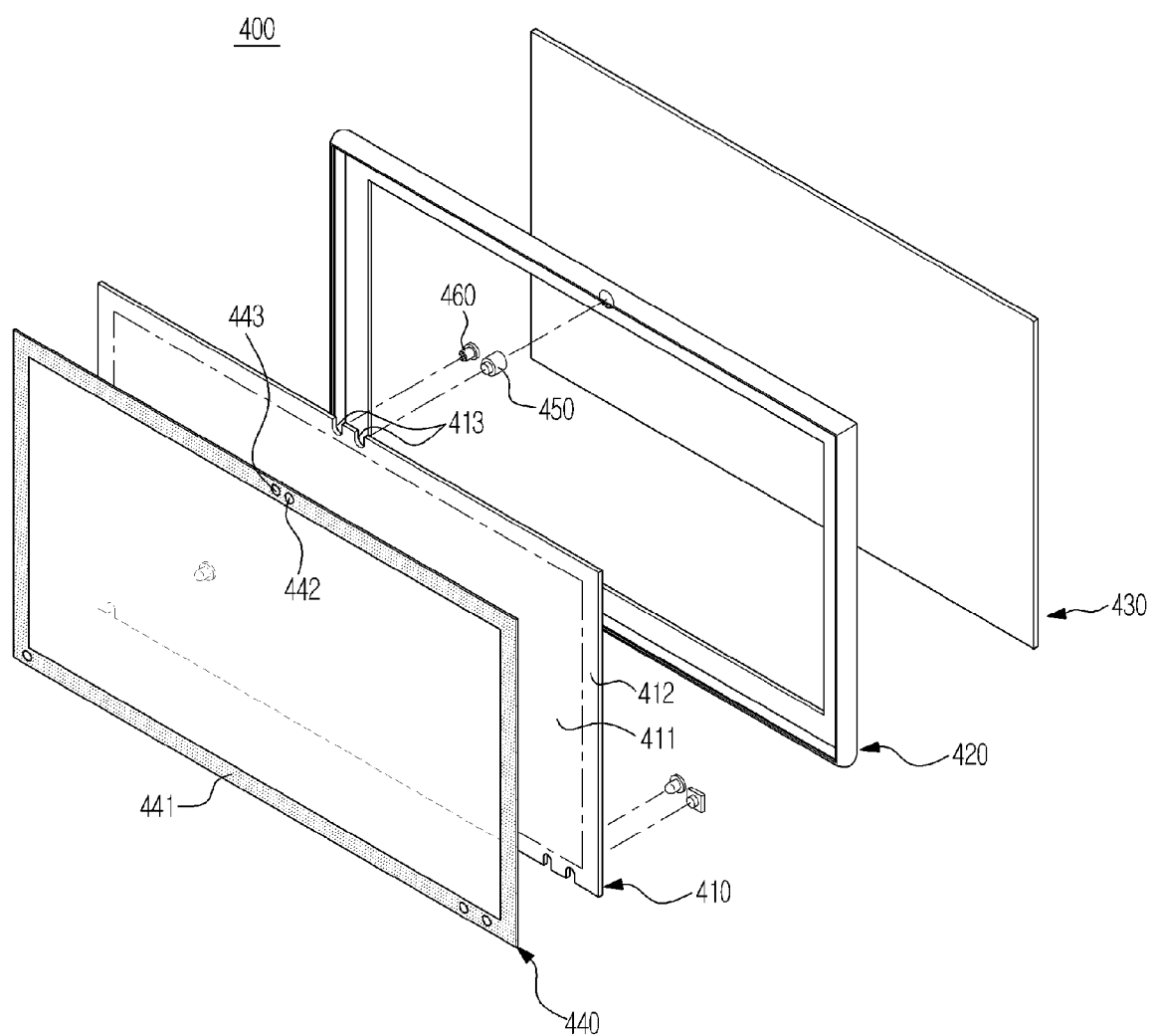
FIG. 9 is an exploded perspective view illustrating installation of a video call unit to a display apparatus according to a further exemplary embodiment.

As illustrated in FIG. 9, the display apparatus 400 includes a display panel 410 in the form of an organic light emitting diode panel, a middle cover 420 to surround a rim of the display panel 410, a rear case 430 defining a rear surface of the display apparatus 400, and a film 440 attached to a front surface of the display panel 410. Although not illustrated, a circuit board to control operation of the display apparatus 400 is placed between the display panel 410 and the rear case 430. In the present exemplary embodiment, the film 440 may be attached to the front surface or rear surface of the display panel 410.

The display panel 410 is divided into an active area 411 on which an image is displayed, and an inactive area 412 on which an image is not displayed. The inactive area 412 is provided with an integrated circuit, wiring, or the like to assist the active area 411 of the display panel 410 in displaying an image. A black matrix 441 is provided at a rim region of the film 440 corresponding to the pattern, i.e. to the inactive area 412 of the display panel 410, to hide the pattern. In the present exemplary embodiment, the black matrix 441 is obtained by blackening a portion of the film 440 corresponding to the inactive area 412.

The display apparatus 400 includes a camera module 450 and a microphone module 460 for a video call. In the present exemplary embodiment, the camera module 450 and the microphone module 460 are arranged on the active area of the display panel 410, i.e. at the rear side of the black matrix 441.

To transmit light and sound to the camera module 450 and the microphone module 460 through the display panel 410, a pair of recesses is formed in the inactive area of the display panel 410. The black matrix 441 of the film 440 has a transparent portion 442 to transmit light to the camera module 450 through the black matrix 441 and a through-hole 443 to transmit sound to the microphone module 460 through the back matrix 441.

Although the present exemplary embodiment describes the camera module 450 and the microphone module 460 as being arranged individually behind the inactive area 412 of the display panel 410, the disclosure is not limited thereto. Similar to the aforementioned exemplary embodiment, the camera module and the microphone module may be included in a single video call unit, and the video call unit may be arranged behind the inactive area of the display panel.

In the present exemplary embodiment, the inactive area 412 of the display panel 410, as described above, is hidden by the black matrix 441 of the film 440. However, the disclosure is not limited thereto, and the video call unit (the camera module and the microphone module) may be arranged behind the bezel of the display apparatus when the bezel is configured to hide the inactive area. In this case, the bezel may have through-holes at positions corresponding to the camera module and the microphone module of the video call unit to transmit light and sound.

In addition, in a display apparatus having a sufficiently wide bezel, the video call unit may be located outside the display panel so as to be parallel to the display panel. Even in this case, the bezel may have through-holes at positions corresponding to the camera module and the microphone module.

As is apparent from the above description, a display apparatus is configured such that a video call unit may be installed to a main body, to enable implementation of a video call.

Although the exemplary embodiments have been shown and described, it would be appreciated by those skilled in the art that changes may be made in these exemplary embodiments without departing from the principles and spirit of the invention, the scope of which is defined in the claims and their equivalents.

What is claimed is:

1. A display apparatus comprising:
   a display panel including an inactive area on which an image is not displayed;
   a film placed at a front surface of the display panel and including a matrix portion obtained by blackening an area corresponding to the inactive area to hide the inactive area; and
   a camera module configured to capture an image; and
   a microphone module configured to input sound,
   wherein the display panel is provided with at least one component receiving portion that forms a space for installing the camera module in a rear of the film, and
   the display panel further includes a through-hole formed at the inactive area to transmit sound to the microphone module.

2. The apparatus according to claim 1, wherein the component receiving portion is formed as a recess to accommodate the camera module.

3. The apparatus according to claim 1, further comprising:
   wherein the microphone module is installed in the space with the camera module.

4. The apparatus according to claim 3, wherein the film further includes a transparent portion to transmit light to the camera module.

* * * * *